3,728,293
POLYURETHANE COMPOSITIONS CONTAINING PHENOL-ALDEHYDE RESINS AND POLYETHER POLYOLS
Llewellyn D. Booth, Lake Jackson, and Kenneth J. Hinze, Angleton, Tex., assignors to The Dow Chemical Company, Midland, Mich.
No Drawing. Continuation-in-part of application Ser. No. 98,139, Dec. 14, 1970, which is a continuation-in-part of application Ser. No. 781,259, Dec. 4, 1968, now abandoned. This application Mar. 13, 1972, Ser. No. 234,320
Int. Cl. C08g 5/10, 5/18
U.S. Cl. 260—17.2    5 Claims

ABSTRACT OF THE DISCLOSURE

The invention concerns non-cellular polyurethane compositions derived from acid catalyzed phenol-aldehyde resins (novolacs) and polyisocyanates. It relates more particularly to non-cellular polyurethane compositions derived from polyether polyols, novolac resins and polyisocyanates.

---

This application is a continuation-in-part of application Ser. No. 98,139 filed Dec. 14, 1970, now abandoned, which is a continuation-in-part of application Ser. No. 781,259 filed Dec. 4, 1968, now abandoned.

The invention concerns non-cellular polyurethane compositions derived from an acid catalyzed phenol-aldehyde resin (novolac) and a polyisocyanate. It relates more particularly to non-cellular polyurethane compositions derived from polyether polyols, novolac resins and polyisocyanates.

It is known to prepare polyurethane compositions, from polyisocyanates and oxyalkylated derivatives of polyhydric alcohols or of oxyalkylated phenol-aldehyde resins, e.g., novolac polyols alone, or in admixture with one another or other organic compounds containing at least two active hydrogen containing groups such as polyether polyols or polyesters.

The polyurethane compositions have many desirable properties. Industry is constantly searching for better components for use in the polyurethane compositions that have the advantages of lower cost, or that will improve the properties, or enhance the resistance to burning, or render it self-extinguishing or non-burning.

It has now been discovered that polyurethane compositions prepared from mixtures containing a predominant amount of OH groups derived from one or more polyether polyols and a minor proportion of OH groups derived from one or more phenol-aldehyde or novolac resins, as the organic compounds containing a plurality of active hydrogen or OH— containing groups as determined by the Zerewitinoff method, which are reacted with an oragnic polyisocyanate, not only possess improved physical properties, but that the phenol-aldehyde resin even in amounts corresponding to from about 5 to about 25 percent of the total OH groups has a surprising action of increasing the tensile strength and of rendering the compositions flame resistant, fire retardant, self-extinguishing and substantially non-burning.

The phenol-aldehyde or novolac resins to be employed in the invention are polynuclear compounds having the structure

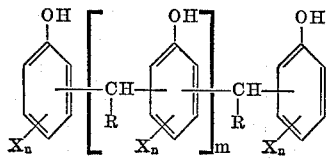

wherein R is hydrogen or an alkyl radical having from 1 to 3 carbon atoms, X is hydrogen, hydroxy, chlorine, bromine or an alkyl radical having from 1 to 12 carbon atoms, $n$ is an integer from 1 to 2 and $m$ is an integer from 0 to 4 and preferably 0.1 to 4.

The novolac resins are prepared by condensing phenol or an ortho or para substituted derivative thereof such as cresol, xylenol, resorcinol, chlorophenol, bromophenol, isopropylphenol, tert.-butylphenol, octylphenol, nonylphenol, dedecylphenol with the aldehyde in acidic solution at reaction temperatures between about 60 to 160° C. The novolac resins may contain from two to six aromatic rings per molecule, but preferably contain an average of from about 2.2 to 3.2 aromatic, preferably benzene rings.

The aldehyde reactant can be formaldehyde, acetaldehyde, propionaldehyde, or butyraldehyde, but is preferably formaldehyde, or its cyclic derivative, e.g., trioxane.

Suitable acidic catalysts for the novolac resin reaction are oxalic acid, zinc acetate, hydrochloric acid, sulfuric acid, or stannous octoate.

The reaction for making the novolac resin is carried out at temperatures between about 60° and 160° C. and at atmospheric pressure or thereabout employing the aldehyde in amount corresponding to from about 0.5 to 1.0 mole, preferably from 0.7 to 0.85 mole, per mole of the phenol initially used, and employing an acidic catalyst such as oxalic acid, zinc acetate, hydrochloric acid, or sulfuric acid.

The novolac resins can range from liquid to fusible organic solvent soluble solids, and as previously stated are used in a minor amount of the total hydroxyl-containing organic compounds to react with an organic polyisocyanate to form the polyurethane compositions of the invention possessing improved physical properties and self-extinguishing characteristics.

The novolac resins are blended with polyether polyols such as the adducts of one or more alkylene oxides having from 2 to 4 carbon atoms such as ethylene oxide, propylene oxide, or butylene oxide with aliphatic hydroxyl-containing compounds having from 2 to about 8 OH groups including, for example, glycols, such as propylene glycol, butylene glycol, butane diol, or glycerol, 1,2,4-butanetriol, 1,2,6-hexanetriol, trimethylolpropane, pentaerythritol, sucrose, hexose, or sorbitol, or with polyols that are adducts of said alkylene oxides and the novolac resins, e.g., novolac polyols, which polyols have hydroxyl numbers in the range of from about 30 to 1200. The novolac resins can also be blended or mixed with polyesters containing hydroxyl groups reactive with organic polyisocyanates to form polyesternovolac resin polyurethane compositions. In all such blends, or mixtures, the novolac resin is used in an amount of from about 5 percent to about 100 percent and preferably from about 5 percent to about 25 percent by weight based on the total weight of the components containing OH or active hydrogen groups.

Any organic aryl polyisocyanate can be employed in making the polyurethane compositions of the present invention. The isocyanate may contain two or more isocyanate radicals. Mixtures of the aryl polyisocyanates can be employed.

Representative polyisocyanate compounds are:

toluene-2,4-diisocyanate,
1,5-naphthalenediisocyanate,
cumene-2,4-diisocyanate,
4-methoxy-1,3-phenylenediisocyanate,
4-chloro-1,3-phenylenediisocyanate,
4-bromo-1,3-phenylenediisocyanate,
4-ethoxy-1,3-phenylenediisocyanate,
2,4′-diisocyanatodiphenylether, 5,6-dimethyl-1,3-phenylenediisocyanate,
2,4-dimethyl-1,3-phenylenediisocyanate,
4,4'-diisocyanatodiphenylether,
benzidinediisocyanate,
4,6-dimethyl-1,3-phenylenediisocyanate,
9,10-anthracenediisocyanate,
4,4'-diisocyanatodibenzyl,
3,3'-dimethyl-4,4'-diisocyanatodiphenylmethane,
2,6'-dimethyl-4,4'-diisocyanatodiphenyl,
2,4-diisocyanatostilbene,
3,3'-dimethyl-4,4'-diisocyanatodiphenyl,
1,4-dimethoxy-4,4'-diisocyanatodiphenyl,
1,4-anthracenediisocyanate,
2,5-fluorenediisocyanate,
1,8-naphthalenediisocyanate,
2,6-diisocyanatobenzfuran,
2,4,6-toluenetriisocyanate, and
2,4,4'-triisocyanatodiphenylether.

Other organic polyisocyanates are the polyisocyanates described in Canada Pat. No. 700,026 and in U.S. Pat. No. 2,683,730; the phenyl indane diisocyanates which are described in U.S. Pat. No. 2,683,730; the phenyl indane diisocyanates which are described in U.S. Pat. No. 2,855,385, the organic diisocyanates which are described in U.S. Pat. No. 2,292,443; and the organic triisocyanates which are described in U.S. Pat. No. 2,292,443; and the organic triisocyanates which are described in U.S. Pat. No. 2,929,794.

The organic polyisocyanate compounds which can be used also include the isocyanate-terminated reaction products of a molar excess of any of the above-described polyisocyanates with polyhydroxy compounds such as those described above as well as dipropylene glycol and the like.

In making the polyurethane compositions of the invention, the proportons of the polyisocyanate compounds and the proportions of the novolac resin and the polyether polyols or other compounds having active hydrogen atoms, can vary widely, but are usually employed in amounts corresponding to from about 0.9 to 2.0, preferably from 1.0 to 1.2 NCO group per active hydrogen atom in the mixture.

The polyisocyanates are usually employed in an amount in excess of that theoretically required to react with the hydrogen atoms and OH groups in the sum of the reactants and water in the mixture of materials, preferably in an amount corresponding to from about 1.0 to 1.2 NCO group for each OH and active hydrogen atom in the starting materials.

The polyurethane compositions can be prepared by a prepolymer procedure, a one-shot process, or a batch-wise technique, all of which methods are known to the art. The products are rigid to semi-rigid to flexible products.

In practice, a mixture of the novolac resin and one or more polyether polyols or polyesters as hereinbefore described is reacted with a polyisocyanate in a typical urethane recipe. The recipe may employ a catalyst and oftentimes advantageously uses a plurality of catalysts such as an amine catalyst and a metal salt of an organic cid.

Among suitable catalysts are sodium acetate; amine catalyst such as tetramethylenediamine (TMDA), tetramethyl guanidine (TMG), tetramethyl-1,1,3,3-butanediamine (TMBDA), triethylenediamine ("DABCO"), trimethylethylenediamine (TMEDA), dimethylethanolamine, triethylamine (TMA), N-ethyl morpholine, and N-ethyl piperidine; and esters of tin, or tin salts, such as stannous oleate, stannous octoate, and dibutyl tin dilaurate, lead salts such as lead octoate, mercury salts such as phenylmercuric acetate. Mixtures or combinations of any two or more of the catalysts can also be used.

The catalysts can be used in amounts corresponding to from about 0.01 to 5 percent based on the total weight of the sum of the weights of the polyols initially used.

Among surface active agents or emulsifiers there may be mentioned, polypropylene glycols having molecular weights between 2000 and 8000, the liquid silicone-glycol copolymers having viscosities of from 350 to 3500 centistokes at 77° F., and polysiloxane polyoxyalkylene block copolymers as described in U.S. Pat. No. 2,834,748.

The following examples illustrates ways in which the principle of the invention has been applied, but are not to be construed as limiting its scope.

EXAMPLE 1

(A) A novolac resin was prepared by adding a charge of 9200 pounds of phenol and 74 pounds of oxalic acid as catalyst, to a reaction vessel equipped with a stirrer and a short distilling column and condenser. The mixture was stirred and was heated to a temperature of about 100° C. A charge of 3600 pounds of aqueous 37 weight percent formaldehyde solution was added with stirring. The mixture was stirred and maintained at about 100° C. for a period of about one hour and 30 minutes. Thereafter, water was removed from the reaction vessel by azeotropic distillation with phenol by heating the reaction mixture at temperatures between about 100° and 140° C., and over a period of about 6 hours. The unreacted phenol was separated by distilling it from the product by heating the reacted mixture at temperatures of from about 155° C. up to about 160° C., at an absolute pressure of 0.5 inch of Hg, followed by dry steam stripping with 60 p.s.i.g. steam at about 160° C. for about 3 hours, followed by stripping at 0.5 in Hg at about 160° C. for about 2 hours to remove the water. The product was a novolac resin having an average molecular weight of 400. The product had the general formula

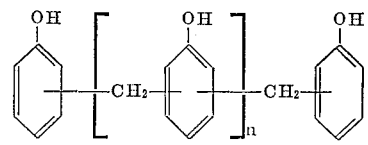

wherein $n$ has an average value of about 1.5.

(B) A novolac resin was prepared by procedure similar to that employed in part A above except that a lesser amount of formaldehyde was employed. The product was a novolac resin having the general formula given in part A wherein $n$ has a value of 0.3.

EXAMPLE 2

A polyurethane elastomer was prepared from a mixture of polyether polyols and the novolac resin prepared in part B of Example 1 using the recipe:

| Ingredients: | Parts by weight |
|---|---|
| Polypropylene glycol mol. wt. 2000 | 80.8 |
| Polyether triol [1] | 14.2 |
| Novolac resin [2] | 5.0 |
| Prepolymer [3] _____index__ | 105 |
| Lead octoate (catalyst) | 0.106 |

[1] The adduct of three moles of propylene oxide with one mole of glycerine, avg. mol. wt. about 260.
[2] A solid novolac resin prepared by reacting a mixture of 4.5 moles of phenol and 1 mole of formaldehyde. The resin had a functionality, i.e., an average of 2.3 OH groups per molecular weight of about 230 and an OH equivalent weight of about 101.
[3] A prepolymer prepared by reacting dipropylene glycol with toluene diisocyanate in amounts such that the product contained 29% by weight NCO groups.

The polypropylene glycol, the triol and the novolac resin were mixed with one another and were heated at 100° C. under vacuum for about 15 minutes to remove volatile vapors or gases, then was cooled to room temperature. The prepolymer was added. The resulting mixture was subjected to reduced pressure to remove dissolved gases, after which the vacuum was broken and the catalyst was added. The resulting mixture was stirred under vacuum for about 30 seconds, after which it was poured in a hot sheet mold and maintained at 100° C. in an oven for 30 minutes. Thereafter, the product was removed from the sheet mold and was cured at 100° C. for 1.5 hours in an air oven. The molded sheet was then allowed to cure at room temperature about 24° C. and 50% relative humidity for 1 week. Thereafter, test pieces were cut from the cured sheet. The test pieces were used to determine the properties of the elastomer product employing procedures similar to those employed in ASTM, D530–62. Die tear strength was determined by procedure described in ASTM, D624–54. Hardness by ASTM, D2240–64T. Flammability was determined by procedure similar to that described in ASTM 1692–59T. The elastomer product had the properties reported under A as follows:

|  | A | B[1] |
|---|---|---|
| Modulus (at 100% elongation), lbs./sq. in | 940 | 420 |
| Modulus (at 200% elongation), lbs./sq. in | 1,810 | 940 |
| Tensile strength, lbs./sq. in | 2,310 | 1,250 |
| Tear strength, lbs./sq. in | 247 | 135 |
| Elongation, percent | 225 | 250 |
| Hardness, Shore A | 90/80 | 75/60 |
| Hardness, Shore D | 45/35 | 30/25 |
| Burning rate, inch/min | 0.59 | 0.65 |

[1] For purpose of comparison, an elastomer was prepared from a mixture of 85% P2000 and 15% triol, i.e., polyether polyols without novolac resin. The properties of this elastomer are reported under B above.

EXAMPLE 3

A polyurethane elastomer was prepared from a mixture of polyether polyols and the novolac resin prepared in part B of Example 1 using the recipe:

Ingredients: Parts by weight
Polypropylene glycol mol. wt. 1300 _____ 40.5
Polypropylene glycol mol. wt. 400 _____ 40.5
Polyether triol _____ 9.0
Novolac resin _____ 10.0
Prepolymer[1] _____Index__ >105
Lead octoate (catalyst) _____ 0.106

[1] A prepolymer prepared by reacting a polypropylene glycol having an average molecular weight of about 400 with an 80/20 mixture of 2,4-/2,6-toluene diisocyanate in an amount such that the product contained about 24% NCO groups by weight.

The procedures were similar to those employed in Example 2. The elastomeric product has the properties listed under A below.

|  | A | B[1] |
|---|---|---|
| Modulus (at 100% elongation), lbs./sq. in | 1,170 | 280 |
| Modulus (at 200% elongation), lbs./sq. in | 1,720 | 480 |
| Tensile strength, lbs./sq. in | 2,980 | 1,900 |
| Tear strength, lbs./sq. in | 466 | 166 |
| Elongation, percent | 280 | 375 |
| Hardness, Shore A | 98/86 | 78/60 |
| Hardness, Shore D | 61/38 | 31/22 |
| Burning rate, inch/min | 0.49 | 0.65 |

[1] For purpose of comparison, an elastomer was prepared from the polyether polyols alone. This elastomer has the properties listed under B above.

EXAMPLE 4

A non-cellular urethane product was prepared by mixing the following components in a paper cup.

42 grams of a 2.3 functional novolac resin
2 grams Dow Corning 195 surfactant
15 grams triethylphosphate
40 grams dioctylphthalate (plasticizer)
0.5 gram of a 50/50 by weight mixture of triethylenediamine and monoethyleneglycol Then 52 grams of Kaiser NCO–20 isocyanate was quickly added and mixed. The mixture was poured into a Pyrex baking dish coated with a fluorocarbon mold release agent. After the product had hardened and cooled, it was removed from the baking dish and tested. The results were as follows:

0.5 inch in 81 seconds burn time ASTM 1692–59T
85 Shore D hardness
3800 p.s.i. tensile strength
<10% elongation

EXAMPLE 5

Several elastomers were prepared by the following procedure.

The polyols were degassed with constant stirring at 85° C. and 2 mm. Hg vacuum for 15 minutes in a one liter, three neck, round bottom distilling flask. The polyol side was cooled to 25° C. and the vacuum was released with a nitrogen pad. The toluene diisocyanate adduct was added to the polyols and the formulation was degassed with constant stirring at 2 mm. Hg for 10 minutes, while the flask was cooled with an air stream. The vacuum was released with a nitrogen pad and the catalyst was added to the formulation. The pressure was reduced to 2 mm. Hg and the formulation was stirred for 30 seconds, while cooling with an air stream. The vacuum was released with a nitrogen pad and the formulation was poured into a 100° C. mold. The formulation was cured at 100° C. for 30 minutes, demolded, and post cured for 1½ hours at 100° C. The elastomers were then stored at 50% relative humidity and 25° C. until tested.

The composition and resultant properties of the elastomers were as follows:

|  | Sample numbers | | |
|---|---|---|---|
|  | 1 | 2 | 3 |
| Component: |  |  |  |
| Polyol A, grams | 96 | 86.4 | 86.4 |
| Polyl B, grams | 12 | 10.8 | 10.8 |
| Polyol C, grams |  | 12.0 |  |
| Novolac resin, grams |  |  | 12.0 |
| Diethylene glycol, grams | 12 | 10.8 | 10.8 |
| Prepolymer, grams | 58.7 | 65.2 | 73.0 |
| NCO/OH ratio | 1.05 | 1.05 | 1.05 |
| Organomercury catalyst, ml | 0.6 | 0.6 | 0.6 |
| Properties: |  |  |  |
| Modulus at 100% elongation, p.s.i. | 930 | 1,880 | 2,390 |
| Tensile strength, p.s.i. | 1,340 | 2,170 | 2,820 |
| Die C tear strength, p.l.i. | 160 | 410 | 465 |
| Elongation, percent | 150 | 140 | 150 |
| Hardness, Shore A | 83 | 93 | 98 |
| Flammability[1] | SE | SE | SE |
| Burning rate, in./min | 0.83 | .54 | 0.42 |

[1] The elastomers were tested for the burning characteristics by using a modification of ASTM designation D-1692–68. The modifications were: (1) The specimen support was ⅛ inch mesh hardware cloth made with ¹⁄₆₄ inch diameter wire, (2) the burner was left under the specimen support during the entire test.

Polyol A was the reaction product of glycerine with propylene oxide end capped with 4.75 moles of ethylene oxide per OH equivalent and having an OH equivalent weight of 1700.

Polyol B was the reaction product of bisphenol A with etheylene oxide in a molar ratio of 1:4 respectively and having an OH equivalent weight of 200.

Polyol C was the reaction product of a 3.2 functional phenolformaldehyde novolac resin with propylene oxide and having an OH equivalent weight of 167.

Novolac resin was a 3.2 functional phenol-formaldehyde condensation product.

Prepolymer was the isocyanate terminated reaction product of an 80/20 mixture of 2,4-/2,6-toluenediisocyanate with dipropylene glycol in a molar ratio of 3:1 respectively.

We claim:
1. A non-cellular polyurethane product which comprises the reaction product of:
   (A) a mixture containing
       (1) from about 75 to about 95% by weight of a polyether polyol which is an adduct of an alkylene oxide having from 2 to 4 carbon atoms with an aliphatic hydroxyl-containing compound having from 2 to about 8 aliphatic hydroxyl groups and having a hydroxyl number in the range of from about 30 to about 1200 and

(2) from about 5 to about 25% by weight of a novolac resin having the general formula

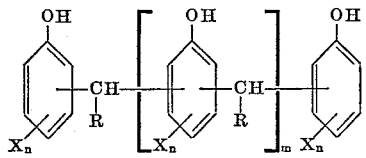

wherein R is hydrogen or an alkyl radical having from 1 to 3 carbon atoms, X is hydrogen, hydroxyl, chlorine, bromine or an alkyl radical having from 1 to 12 carbon atoms, $n$ is an integer from 1 to 2 and $m$ is an integer from 0 to about 4, with (B) an organic polyisocyanate and a catalyst for urethane formation; wherein said polyisocyanate is employed in proportions corresponding to from about 0.9 to 2.0 NCO groups for each active H atom in the mixture of reactive materials.

2. The product of claim 1 wherein the value of $m$ in component (A2) is from 0.1 to about 4.

3. The product of claim 2 wherein the aliphatic hydroxyl-containing compound is selected from a glycol, glycerol, 1,2,4-butanetriol, 1,2,6-hexanetriol, trimethylol propane, pentaerythritol, sucrose, hexose or sorbitol.

4. A non-cellular polyurethane product as claimed in claim 3 wherein the novolac resin is derived from phenol and formaldehyde.

5. A non-cellular polyurethane product as claimed in claim 3 wherein the polyisocyanate is used in proportions corresponding to from about 1.0 to about 1.2 NCO groups for each active H atom in the mixture of reactive materials.

References Cited

UNITED STATES PATENTS

| | | | |
|---|---|---|---|
| 3,497,465 | 2/1970 | Kujawa et al. | 260—58 UX |
| 3,538,040 | 11/1970 | Grazen | 260—59 UX |
| 3,533,972 | 10/1970 | Pawlak et al. | 260—59 X |
| 3,598,771 | 8/1971 | Davis et al. | 260—59 X |
| 3,265,641 | 9/1966 | Wismer et al. | 260—59 X |
| 3,010,919 | 11/1961 | MacKinney et al. | 260—17.2 |

HOWARD E. SCHAIN, Primary Examiner

U.S. Cl. X.R.

260—52.58; 264—347

PO-1050
(5/69)

UNITED STATES PATENT OFFICE
CERTIFICATE OF CORRECTION

Patent No. 3,728,293     Dated April 17, 1973

Inventor(s) Llewellyn D. Booth and Kenneth J. Hinze

It is certified that error appears in the above-identified patent and that said Letters Patent are hereby corrected as shown below:

Col. 2, l. 2, change "hydroxy" to read --hydroxyl--.

Col. 2, l. 10, change "dedecylphenol" to read --dodecylphenol--.

Col. 3, l. 60, change "cid" to read --acid--.

Col. 5, l. 35, change ">105" to read --105--.

Signed and sealed this 15th day of October 1974.

(SEAL)
Attest:

McCOY M. GIBSON JR.
Attesting Officer

C. MARSHALL DANN
Commissioner of Patents